United States Patent
Karatay et al.

(10) Patent No.: US 12,261,342 B2
(45) Date of Patent: Mar. 25, 2025

(54) GEOMETRIC SHAPES FOR REDUCED MANIFOLD PRESSURE DROP

(71) Applicant: ELECTRIC HYDROGEN CO., Natick, MA (US)

(72) Inventors: Elif Karatay, Mountain View, CA (US); Jeffrey Dean Glandt, Vancouver (CA); Alex Panchula, Hillsborough, CA (US); Curt C. Ebner, Redwood City, CA (US)

(73) Assignee: ELECTRIC HYDROGEN CO., Devens, MA (US)

( * ) Notice: Subject to any disclaimer, the term of this patent is extended or adjusted under 35 U.S.C. 154(b) by 0 days.

(21) Appl. No.: 18/687,265

(22) PCT Filed: Dec. 21, 2022

(86) PCT No.: PCT/US2022/053700
§ 371 (c)(1),
(2) Date: Feb. 27, 2024

(87) PCT Pub. No.: WO2023/129453
PCT Pub. Date: Jul. 6, 2023

(65) Prior Publication Data
US 2024/0274856 A1 Aug. 15, 2024

Related U.S. Application Data

(60) Provisional application No. 63/294,561, filed on Dec. 29, 2021.

(51) Int. Cl.
*H01M 8/2484* (2016.01)
(52) U.S. Cl.
CPC ................. *H01M 8/2484* (2016.02)
(58) Field of Classification Search
CPC .................................................. H01M 8/2484
See application file for complete search history.

(56) References Cited

U.S. PATENT DOCUMENTS

| | | | | |
|---|---|---|---|---|
| 4,288,988 A | * | 9/1981 | Curtil | F01D 9/06 60/605.1 |
| 4,654,136 A | * | 3/1987 | Dang | C25B 9/65 204/290.13 |
| 4,707,986 A | * | 11/1987 | Takada | F01N 13/004 60/323 |
| 6,635,378 B1 | * | 10/2003 | Yang | H01M 8/0263 429/513 |
| 2002/0076601 A1 | * | 6/2002 | Guthrie | H01M 8/249 429/461 |
| 2003/0118878 A1 | * | 6/2003 | Pinto | F15D 1/04 60/739 |
| 2003/0124409 A1 | * | 7/2003 | Cramer | H01M 8/2485 429/458 |
| 2003/0203261 A1 | | 10/2003 | Rapaport et al. | |
| 2010/0062289 A1 | | 3/2010 | Christie et al. | |
| 2010/0173209 A1 | | 7/2010 | Jayaraman et al. | |
| 2011/0131963 A1 | | 6/2011 | Reinhart et al. | |
| 2020/0300150 A1 | * | 9/2020 | Mohr | F02M 35/10032 |

FOREIGN PATENT DOCUMENTS

| | | |
|---|---|---|
| EP | 2930326 A1 | 10/2015 |
| WO | 2020030343 A1 | 2/2020 |

OTHER PUBLICATIONS

Written Opinion of the International Searching Authority for PCT/US2022/053700, mailed Apr. 10, 2023, pp. 1-9.

* cited by examiner

*Primary Examiner* — Muhammad S Siddiquee
(74) *Attorney, Agent, or Firm* — Lempia Summerfield Katz LLC

(57) ABSTRACT

The following disclosure relates to junctions for combining a flow at an outlet manifold. More specifically, the following disclosure relates to junctions configured to reduce outlet manifold pressure enabling the use of smaller outlet manifolds for electrochemical cells and cell stacks.

19 Claims, 8 Drawing Sheets

GEOMETRIC SHAPES FOR REDUCED MANIFOLD PRESSURE DROP

The present patent document is a § 371 nationalization of PCT Application Serial No. PCT/US2022/053700, filed Dec. 21, 2022, designating the United States, which claims the benefit of U.S. Provisional Patent Application No. 63/294,561, filed Dec. 29, 2021, which are hereby incorporated by reference in their entireties.

FIELD

The following disclosure relates to junctions for combining a flow at an outlet manifold, and more specifically to junctions configured to reduce outlet manifold pressure enabling the use of smaller outlet manifolds.

BACKGROUND

Generally, during water electrolysis, an inlet manifold supplies a flow of water to a plurality of electrochemical (e.g., electrolytic) cells or an electrochemical cell stack having a plurality of cells. In some instances, a flow of water is only provided to the anode side of an electrochemical cell or cell stack. In other instances, a flow of water may be provided to both the anodic and cathodic sides of the electrochemical cell or cell stack.

The flow of water through an inlet manifold is split amongst the plurality of cells or cell stacks. In some instances, an inlet manifold may be provided for both the anode side and the cathode side of the cell or cell stack. During water electrolysis, oxygen ($O_2$) is generated on the anode side of the cell or cell stack and hydrogen ($H_2$) is generated on the cathode side of the cell or cell stack. A two-phase flow of oxygen and unreacted water is outlet from the anode side of the cell or the cell stack. In instances where water is also supplied to the cathode side of the cell or cell stack, a two-phase flow of hydrogen and unreacted water is outlet from the cathode side of the cell or the cell stack. The two-phase flows from the plurality of cells or cell stack are recombined in each of an anode side outlet manifold and a cathode side outlet manifold.

In an inlet manifold, the velocity of the water supplied to the cells decreases due to flow rate loss down the inlet manifold to each side of the cells or cell stacks. The loss in dynamic pressure is converted into static pressure, resulting in a static pressure increase at the inlet manifold. Further, while mass flow rates at a manifold inlet and manifold outlet are similar, volumetric flow rates at the manifold outlet are considerably higher, due to the generation of gas. Both the increase in static pressure at the manifold inlet and the increase in volumetric flow rate result in high velocity jets outlet from the plurality of electrochemical (e.g., electrolytic) cells or an electrochemical cell stack into the outlet manifold.

The high velocity jets flowing from the plurality of cells or cell stacks into the outlet manifold affect the pressure of the outlet manifold. To achieve a balanced manifold pressure difference and good flow distribution amongst cells, it is common to use an outlet manifold larger than the inlet manifold. For example, an optimal outlet-to-inlet manifold diameter ratio may be 1.5.

While using an outlet manifold larger than the inlet manifold may yield better flow sharing and a balanced manifold pressure, the larger manifold size may be undesirable for other reasons. Using a larger manifold results in increased piping cost and lower cell utilization which may become critical in applications where electrochemical (e.g., electrolytic) cells use flow plates made of expensive metals, such as titanium. Accordingly, there is a need to reduce outlet manifold pressure drop allowing the use of smaller outlet manifold while maintaining improved flow rate sharing and a balanced manifold pressure.

SUMMARY

In one embodiment, an apparatus including an outlet may be configured to supply a flow of gas and/or liquid to an outlet manifold such that the flow of gas and/or liquid enters the outlet manifold along a first direction. The outlet manifold may be configured to receive the flow of gas and/or liquid and the outlet manifold may extend longitudinally along an axis such that the received flow of gas and/or liquid is configured to flow out of the outlet manifold in a second direction. The outlet is connected to the outlet manifold at a junction, wherein, at the junction, the outlet is connected to the outlet manifold at an angle between 90° and 180°, the angle being defined as an angle between by the first direction of flow and the second direction of flow downstream of the junction. The supply of the flow of gas and/or liquid to the outlet manifold along the first direction is such that the supply of the flow comprises a positive component velocity in the second direction of the flow out of the outlet manifold.

In another embodiment, a junction apparatus includes an outlet configured to supply a first flow to an outlet manifold, the outlet manifold being configured to contain a second flow, wherein the outlet includes a mouth adjacent to the outlet manifold, the mouth being configured to allow the first flow to expand as the first flow enters the outlet manifold, therein reducing friction losses at the junction.

In another embodiment, a junction apparatus includes a first outlet configured to supply a first flow to an outlet manifold, and one or more secondary outlets configured to supply one or more secondary flows to the outlet manifold, the one or more secondary outlets having inclination angles relative to the outlet manifold configured to reduce the pressure in the outlet manifold by creating a uniform circular flow in the outlet manifold.

In another embodiment, a junction apparatus includes a first outlet configured to supply a first flow to an outlet manifold and one or more secondary outlets configured to supply one or more secondary flows to the outlet manifold. The junction apparatus further includes the outlet manifold including a second flow. The first outlet and the one or more secondary outlets include elbows that extend into the outlet manifold and supply the first flow and the one or more secondary flows in the same direction as the second flow.

In another embodiment, a method of combining flows at an outlet manifold includes supplying a first flow of fluid to an outlet manifold at a junction such that the first flow of fluid enters the outlet manifold in a first direction and directing a second flow of fluid through the outlet manifold such that the second flow moves through the outlet manifold in a second direction along a longitudinal axis, wherein the first flow of fluid supplied to the outlet manifold in the first direction is supplied such that the first flow comprises a positive component velocity in the second direction along the longitudinal axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

FIG. 3A depicts an example of an H-manifold configuration. FIG. 3B depicts an example of a U-manifold configuration. FIG. 3C depicts an example of a Z-manifold configuration.

FIG. 4A illustrates an example of a junction including a side cross section of an outlet manifold and a plurality of outlets. FIG. 4B illustrates an example of a junction including a cross section of an outlet manifold in the direction of flow.

DETAILED DESCRIPTION

Disclosed herein are a plurality of junctions for combining flows at an outlet manifold. The junctions disclosed herein may be configured to reduce pressure in an outlet manifold allowing for a lower pressure outlet manifold. Reducing pressure in an outlet manifold may allow smaller outlet (e.g., exhaust) manifolds to be used for electrochemical (e.g., electrolytic) cell and/or cell stack outlet manifolds. This may be advantageous for several reasons, including cost of equipment and reductions in size/space of the manifold.

In certain examples, the junctions disclosed herein may be used with a water electrolysis system. Nonetheless, the junctions disclosed herein are not limited to use in such a water electrolysis system and may be applicable to other systems requiring reduced pressure in an outlet manifold.

Figure 1:
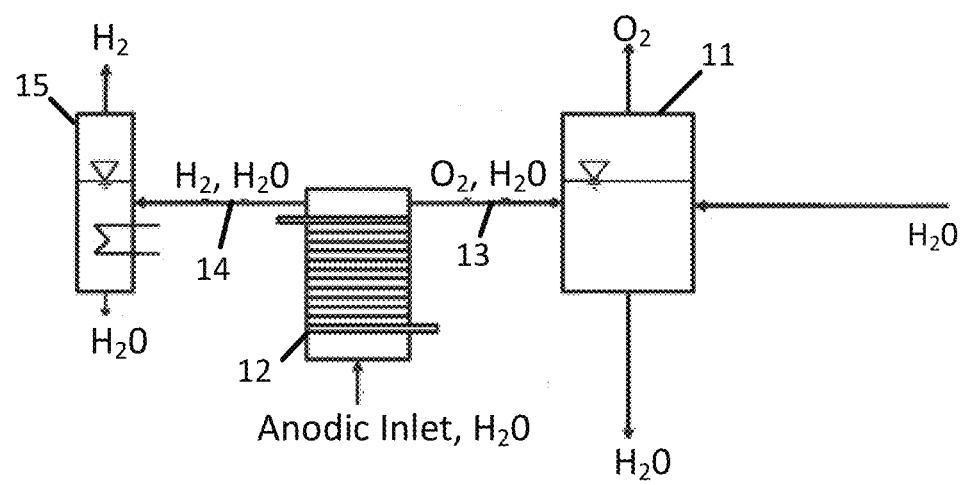
FIG. 1 depicts an example section of a water electrolysis system configured to utilize one or more of the junctions disclosed herein.

FIG. 1 depicts an example of a section of a water electrolysis system 10 that may include one or more of the junctions disclosed herein. The system 10 as illustrated in FIG. 1 includes an anodic gas-liquid separator 11, an electrolytic cell stack 12 having a plurality of electrolytic cells, an anodic outlet manifold 13, a cathodic outlet manifold 14, and a cathodic gas-liquid separator 15. Additional downstream components of the system 10 following the cathodic gas-liquid separator 15 have not been depicted in FIG. 1 to provide a simplified excerpt of a system, but may include additional water-gas separators, purifiers, heat exchangers, circulation pumps, pressure regulators, etc. Further, addi-tional downstream components of the system 10 following the anodic gas-liquid separator 11 have not been depicted in FIG. 1 to provide a simplified excerpt of a system, but may include additional gas-liquid separators, purifiers, heat exchangers, circulation pumps, pressure regulators, etc.

As illustrated in the system 10 of FIG. 1, water ($H_2O$) may flow from an external source to the anodic gas liquid separator 11. The anodic gas-liquid separator 11 may remove any gaseous oxygen entrained the flow of water entering the anodic gas-liquid separator. The water is then outlet from the gas liquid separator 11. The water outlet from the anodic gas-liquid separator 11 may be supplied to the anodic inlet of an electrolytic cell stack 12. In some embodiments, the water outlet from the anodic gas-liquid separator may further go through de-ionization and/or a heat exchanging process before being inlet to the electrolytic cell stack 12. In some embodiments, the anodic inlet of the cell stack 12 may receive water from a source other than the anodic gas-liquid separator 11.

In some embodiments, only the anodic inlet of the cell stack 12 may receive water. In these embodiments, the cathode side of the cell stack 12 may not receive water (e.g., a dry cathode side may be used). In other embodiments, a cathode inlet may also receive water from the anodic gas-liquid separator 11 or another source. In these embodiments, the water may be supplied to the cathode inlet to cool the cell stack 12 during electrolysis.

The water supplied to the anodic inlet flows to an anodic inlet manifold that distributes the water to the anode side of the plurality of cells contained with the cell stack 12. In embodiments where water is supplied to the cathode inlet, water supplied to the cathode inlet flows to a cathodic inlet manifold that distributes the water to the cathode side of the plurality of cells in the cell stack 12.

During electrolysis, oxygen ($O_2$) is produced at the anode side or interface of the electrolytic cells and hydrogen ($H_2$) is produced at the cathode side or interface of the electrolytic cells. Specifically, a water splitting electrolysis reaction is configured to take place within each individual cell in the cell stack 12. Each cell includes one interface (the anode side of the cell) configured to run an oxygen evolution reaction (OER) and another interface (the cathode side of the cell) configured to run a hydrogen evolution reaction (HER). For example, the anode reaction is $H_2O \rightarrow 2H^+ + \frac{1}{2}O_2 + 2e$ and the cathode reaction is $2H^+ + 2e \rightarrow H_2$.

During electrolysis, some of the water supplied to the anode side of an electrolytic cell may not be converted into oxygen. Accordingly, a two-phase flow of oxygen and unreacted water is outlet from each of the anode sides of the cells into an anodic outlet manifold 13. In some embodiments, a two-phase flow of oxygen and unreacted water is outlet from each of the anode sides of a plurality of cell stacks 12 into the anodic outlet manifold 13. The two-phase flow of oxygen and unreacted water flows from the cell stack 12 to the anodic gas-liquid separator 11 through the anodic outlet manifold 13. The anodic gas liquid separator 12 may be configured to separate the unreacted water from the gaseous oxygen.

Additionally, in some embodiments, water may be supplied to the cathode side of the cell stack as a coolant. Accordingly, a two-phase flow of hydrogen and water is outlet from each of the cathode sides of the cells to a cathodic outlet manifold 14. In some embodiments, a two-phase flow of oxygen and unreacted water is outlet from each of the cathode sides of a plurality of cell stacks 12 into the cathodic outlet manifold 13. The two-phase flow of hydrogen and water flows from the cell stack 12 to the cathodic gas-liquid separator 15 through the cathodic outlet manifold 14. The cathodic gas-liquid separator 15 may be configured to separate the water from the gaseous hydrogen.

In some embodiments, the anodic outlet manifold 13 and cathodic outlet manifold outlet 14 may receive anodic side outlet flow and cathodic side outlet flow, respectively, from a plurality of cells in the cell stack 12. In some instances, particularly when the system 10 is used in a factory or plant setting, a significant pressure increase will occur in the anodic outlet manifold 13 and/or cathodic outlet manifold 14 due to the high velocity jets entering the anodic outlet manifold 13 and/or cathodic outlet manifold 14 from the anode side and cathode side of the cells or cell stacks, respectively. In some instances, increased pressure in the anodic outlet manifold 13 and/or cathodic outlet manifolds 15 requires the outlet manifolds to be sized larger than their input counterparts in order to yield improved flow sharing and balanced manifold pressure.

Figure 2:
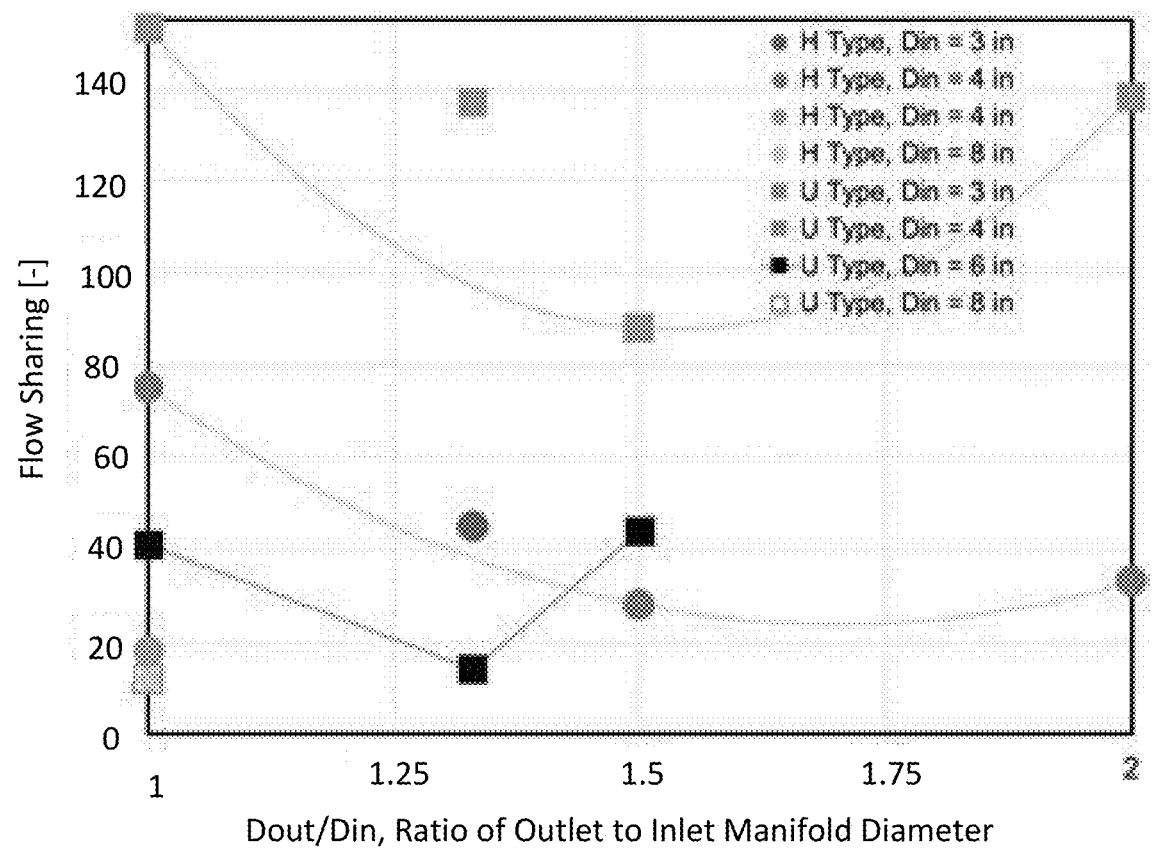
FIG. 2 depicts a graph exemplifying an optimal range of ratios of outlet to inlet manifold diameter for use with electrolytic cells or cell stacks.

FIG. 2 depicts a graph exemplifying a range of ratios of outlet to inlet manifold diameter for use with various electrochemical (e.g., electrolytic) cells or cell stacks. The x-axis of FIG. 2 includes the ratio of outlet to inlet diameter and the y-axis of FIG. 2 includes the percentage of flow sharing. The percentage of flow sharing as illustrated on the y-axis can be calculated by determining the volumetric flow rate of a flow through each of a plurality of cells or cell stacks connected to an inlet manifold and determining a range of volumetric flow rates through the cells (e.g., a difference between the largest volumetric flow rate and the smallest volumetric flow rate of the volumetric flow rates through the cells). The percentage of flow sharing is then determined by dividing the range of the volumetric flow rates by an average volumetric flow rate through all of the cells or cell stacks. FIG. 2 illustrates, an optimal range of outlet diameter size to inlet diameter size for a variety of manifold configurations and sizes, including H and U type manifold configurations, may be around 1.3:1-1.5:1 (i.e., wherein the outlet diameter is 1.3-1.5 times as large as the inlet diameter). Further, an optimal outlet to inlet diameter ratio for Z type manifold configurations may also be 1.3:1-1.5:1.

As noted above, there is a need to reduce this outlet to inlet diameter ratio to be closer to 1:1, wherein the outlet diameter and inlet diameter are approximately the same size (e.g., within 1%, within 5%, or within 10% of the same diameter).

Figure 3A:
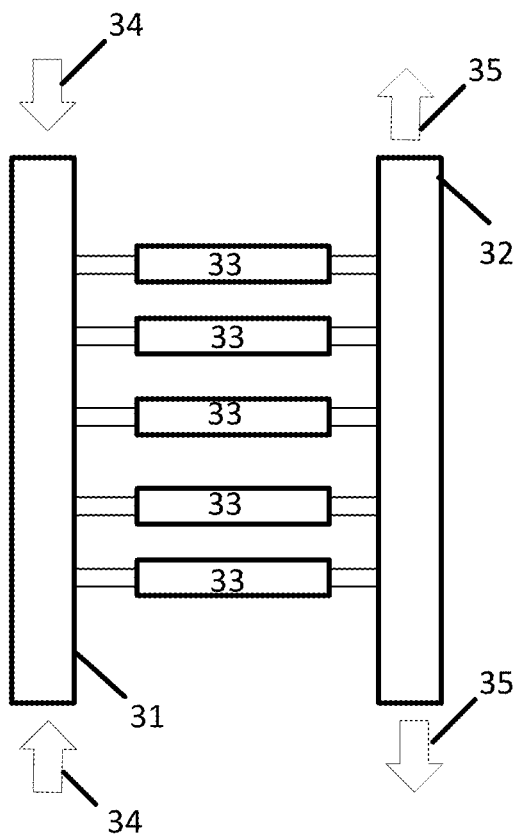
FIGS. 3A-3C depict examples of manifold configurations.
Figure 3B:
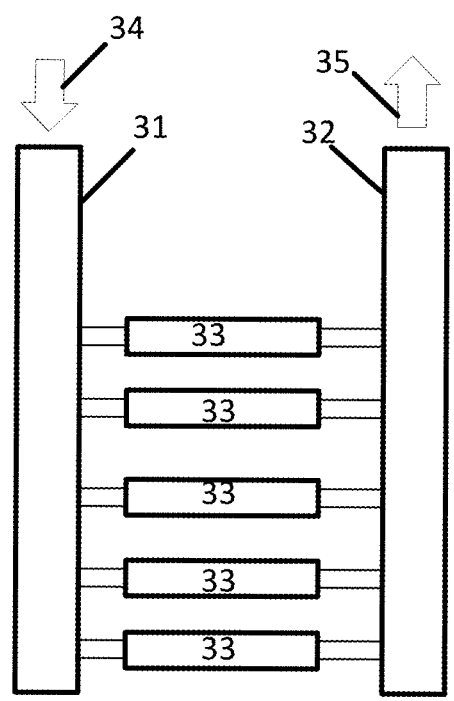
Figure 3C:
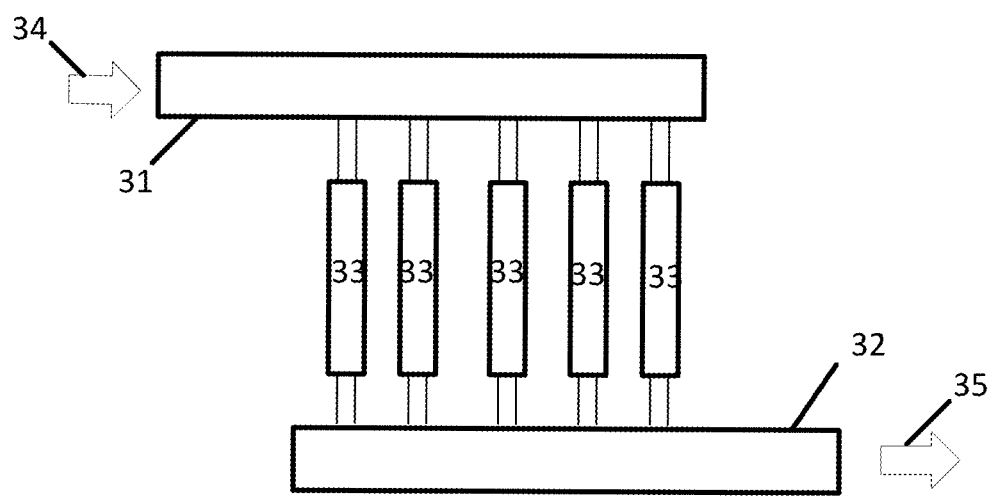

FIGS. 3A-3C depict manifold configurations. FIG. 3A depicts an H-manifold configuration. FIG. 3B depicts a U-manifold configuration. FIG. 3C depicts a Z-manifold configuration.

Each of the manifold configurations depicted in FIGS. 3A-3C includes an inlet manifold 31 supplying a flow to a plurality of cells 33 and an outlet manifold 32 receiving an outlet flow from the plurality of cells 33. In some embodiments, the inlet manifold 31 may supply a flow to a plurality of cell stacks instead of cells 33 as depicted in FIGS. 3A-3C and accordingly, the outlet manifold 32 may receive an outlet flow from a plurality of cell stacks instead of cells 33. The inlet manifold 31 may supply a flow to additional or fewer cells 33 or cell stacks and the outlet manifold 32 may receive an outlet flow from additional or fewer cells 33 or cell stacks. Each of the manifold configurations as illustrated in FIGS. 3A-3C includes one or more inlet flows 34 entering the inlet manifold 31 and one or more outlet flows 35 exiting the outlet manifold 32.

Figure 4A:
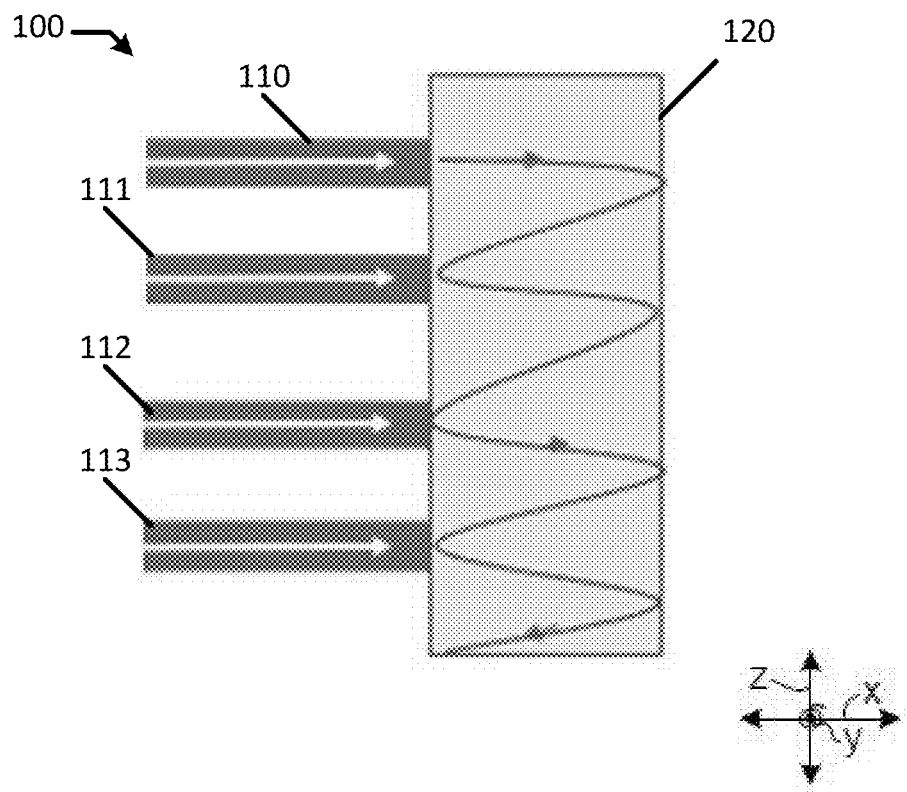
FIGS. 4A and 4B illustrate examples of junctions where an outlet flow enters an outlet manifold.
Figure 4B:
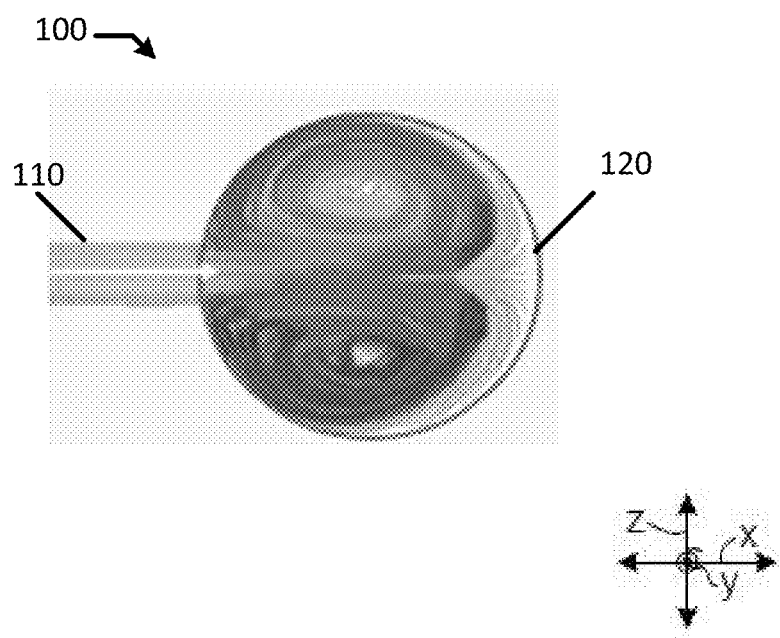

FIGS. 4A and 4B illustrate a junction 100 where an outlet flow enters an outlet manifold. FIG. 4A illustrates a junction 100 including a side cross section of an outlet manifold and a plurality of outlets. FIG. 4B illustrates a cross section of the junction in FIG. 4A. The junction 100 as illustrated in FIGS. 4A and 4B may be a traditional junction used to recombine a plurality of flows from a plurality of electrolytic cells or electrolytic cell stacks at an outlet manifold. As illustrated in FIG. 4A, outlets 110, 111, 112, and 113 each supply a flow to outlet manifold 120. Outlets 110, 111, 112, and 113 may each supply a flow from an electrolytic cell or cell stack. As illustrated in FIG. 4B, the flow from outlet 110 may enter the outlet manifold 120 such that piping of the outlet 110 and its average direction of flow from outlet 110 (in the direction of the x-axis) is perpendicular to the piping of the outlet manifold 120 and its average direction of flow (in the direction of the z-axis). Further, the flow from outlet 110 may enter the outlet manifold 120 such that the flow enters toward a center point of the outlet manifold 120. Flows from outlets 111, 112, and 113 may enter the outlet manifold similarly to the flow from outlet 110. Outlets 110, 111, 112, and 113 may each carry a flow from an anode side of an electrolytic cell or cell stack. Alternatively, the outlets may each carry a flow from the cathode side of the electrolytic cell or stack. In some examples, outlets 110, 111, 112, and 113 may each carry a two-phase flow of liquid and gas.

As discussed above, a pressure increase is caused in the outlet manifold 120 when the plurality of high-velocity flows enter the outlet manifold through outlets 110, 111, 112, and 113. As discussed above, the increase in pressure may be in part due to the static pressure at the inlet manifold. Further, the increase in pressure may be in part due to the increase in volumetric flow rate occurring as gas is generated on the anode or cathode side of the electrolytic cells or cell stacks.

Accordingly, when a junction as illustrated in FIGS. 4A and 4B is used, regardless of manifold configuration, the optimal outlet to inlet diameter ratio may be 1.3:1-1.5:1. Using an outlet manifold having a diameter that is 1.3-1.5 times larger than the inlet diameter causes an increase in piping costs. Further, using an outlet manifold having a diameter that is 1.3-1.5 times larger than the inlet diameter may result in lower cell utilization, which may be of primary importance in applications where electrolyzers are using flow pates made from expensive metals, such as titanium.

As noted above, there is a need to reduce this outlet to inlet diameter ratio to be closer to 1:1, wherein the outlet diameter and inlet diameter are approximately the same size (e.g., within 1%, within 5%, or within 10% of the same diameter).

Figure 5A:
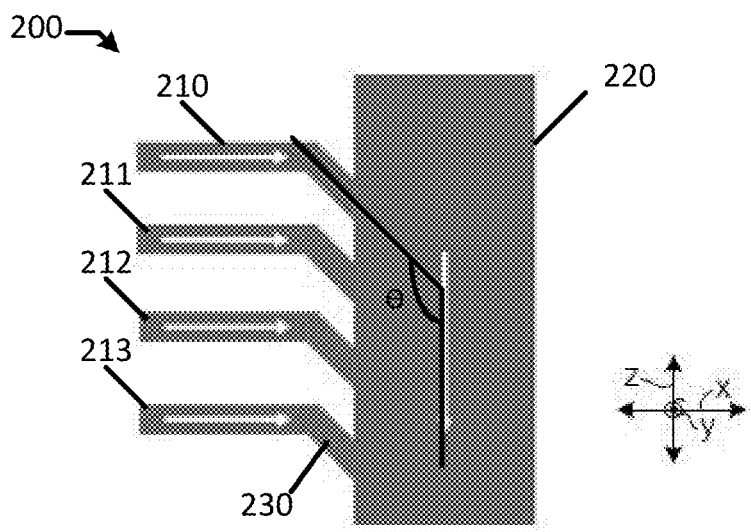
FIG. 5A illustrates an example of a junction including a side cross section of an outlet manifold and a plurality of outlets.

FIG. 5A illustrates a junction according to an exemplary embodiment of the present disclosure having a junction including a side cross section of an outlet manifold and a plurality of outlets. The junction 200 as illustrated in FIG. 5A includes outlets 210, 211, 212, and 213 flowing into outlet manifold 220. In certain embodiments, one or more of the outlets 210, 211, 212, and 213 and the outlet manifold 220 may include a corrosion resistant metal such as stainless steel. In other embodiments, the one or more of the outlets 210, 211, 212, and 213 and the outlet manifold 220 may include a metal composition having titanium, gold, or the like. In other embodiments, one or more of the outlets 210, 211, 212, 213 and the outlet manifold 220 may include a base composition (e.g., a first metal) and a coating composition (e.g., a second metal) that is configured to prevent leaching of ions from the base composition. For example, the coating composition (e.g., second metal) may prevent iron contamination of high purity electrolysis water flowing through outlets 210, 211, 212, 213 and the outlet manifold 220. Examples of a second coating metal composition may include titanium, gold, and the like.

As illustrated in FIG. 5A, each of the outlets 210, 211, 212, and 213 includes an angled portion 230 adjacent to the outlet manifold 220. The angled portion 230 is angled such that flow through outlets 210, 211, 212, and 213 enters the outlet manifold 220 with a component of the flow velocity from outlets 210, 211, 212, and 213 corresponding to the direction of flow through the outlet manifold 220. Each angled portion 230 may have the same cross-sectional area as the outlet 210, 211, 212, and 213 in which it is included. In some examples, the angled portion 230 may be integrally formed with each outlet 210, 211, 212, or 213. In other examples, an angled portion 230 may be formed separate from and attached to one of the outlets 210, 211, 212, or 213. In some examples, one or more of the angled portions may be integrally formed with the outlet manifold 220. In other examples, one or more of the angled portions 23 may be formed separately from and attached to the outlet manifold 220.

The angled portion 230 of outlets 210, 211, 212, and 213 may be configured such that there is an angle Θ between a flow from outlet 210 in a first direction and a flow in outlet manifold 220 in a second direction downstream of the junction 200. In some embodiments, the angle Θ is greater than 90° and less than 180°. In some embodiments, the angle Θ may be between 90°-165°, between 90°-150°, between 90°-135°, or between 90°-120°. In some embodiments, the angle Θ may be in a range of 105°-165°, in a range of 105°-150°, or in a range of 105°-135°. In other embodiments, the angle Θ may be in a range of 120°-150°. The angled portion 230 of outlets 210, 211, 212, and 213 may help to reduce the pressure in the outlet manifold 220 by suppling an outlet flow with a component velocity corresponding to the direction of flow in outlet manifold 220. In some embodiments, an angle Θ and the diameter of outlets 210, 211, 212, and 213, and a diameter of outlet manifold 220 may be selected dependent on a pressure drop in the electrolytic cells. In other embodiments, the sizes of constituent components of junction 200 and angle Θ may be selected in consideration of one another. Junction 200 may further reduce friction losses stemming from the impingement of one or more of the high-velocity flows from outlet 210, 211, 212, and 213 impinging on a wall of outlet manifold 240. Further, junction 200 may reduce a swirling effect in outlet manifold 220, further reducing pressure in outlet manifold 220. The angled portion 230 of each of the outlets 210, 211, 212, and 213 may reduce pressure in the outlet manifold 220 and may advantageously allow an outlet manifold 220 having a smaller diameter to be used, thus reducing material costs, and improving cell/stack efficiency.

Figure 5B:
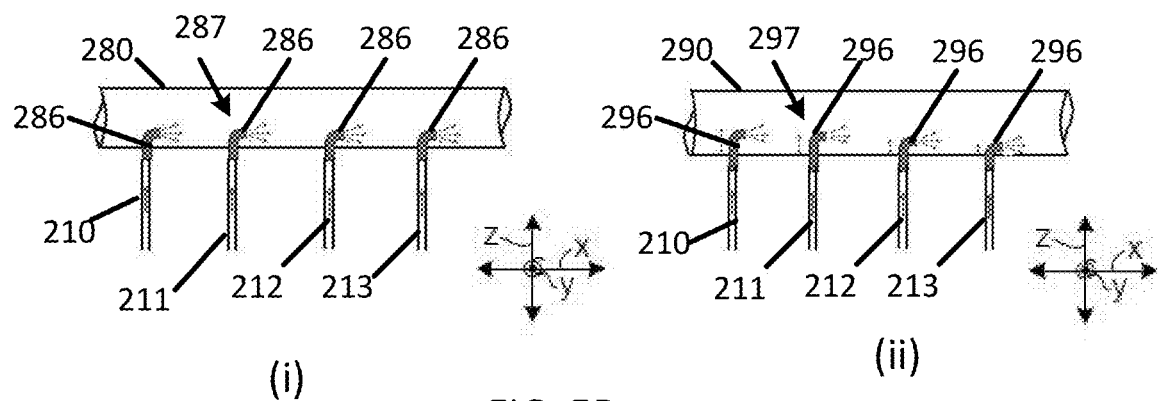
FIGS. 5B(i) and 5B(ii) illustrate a junction according to an exemplary embodiment.

Similar benefits of FIG. 5A can be obtained by inserting elbows 286 and 296 into the outlet manifold pipe as illustrated in FIG. 5B(i) and (ii). Holes can be opened in the outlet manifold 280 and 290 at appropriate spacings, distance between outlet jets, e.g., 210 to 211. In some examples, the distance or spacing between the holes may be a uniform distance. In other examples, the spacing of the holes may be non-uniform. Holes can be manufactured by drilling, machining, or other cheaper manufacturing methods, e.g., stamp out dimple dies in the interior surface of the pipe, to give smooth tapered or flared out holes. Elbow elements 286 and 296 can be inserted into outlet manifolds 280 and 290 and then can be attached to outlet jets 210, 211, 212, and 213). For example, a threaded connection, welding, adhesives, fasteners, or the like may be used to attach the elbow elements 286, 296 to outlet jets 210, 211, 212, 213. The elbow elements 286, 296 may be attached to the outlet manifold 280, 290. For example, welding, an adhesive, and/or fasteners may be used to attach the elbow elements 286, 296 to the outlet manifold 280, 290. The extent of elbows inserted into the pipe in x direction can be adjusted. Outlet jets enter the elbow element in x-direction and are directed in main flow direction in z-, which may reduce swirling effect in outlet manifolds 280 and 290, further reducing pressure in outlet manifolds 280 and 290. Inserting elbows into outlet manifold 280 and 290 may provide an easy and inexpensive way to reduce swirling affects and accordingly pressure in outlet manifolds 280 and 290.

As illustrated in (i) of FIG. 5B, in some embodiments, outlets 210, 211, 212, and 213, and accordingly elbows 286 may extend into (i.e., penetrate) outlet manifold 280 the same depth at junctions 287 between the outlet manifold 280 and outlets 210, 211, 212, and 213. As illustrated in (ii) of FIG. 5B, in some embodiments, outlets 210, 211, 212, and 213 and accordingly elbows 296 may extend (i.e., penetrate) outlet manifold 290 to different depths at junction 297 between the outlet manifold 290 and outlets 210, 211, 212, and 213. As illustrated in (ii) of FIG. 5B, in some embodiments, the farther an outlet is downstream in the outlet manifold 290, the smaller the distance the outlet and elbow extends into the outlet manifold 290. Inserting elbows extending different depths may advantageously reduce or minimize interference of the elbows extending into the outlet manifold with the flow through the outlet manifold 290. In other embodiments, a repeating sequence of outlet and elbow penetration depths may be used. The elbows 286 and 296 may reduce or minimize pressure in the outlet manifold, advantageously allowing an outlet manifold having a smaller diameter to be used thus reducing material costs and improving cell/stack efficiency.

Figure 5C:
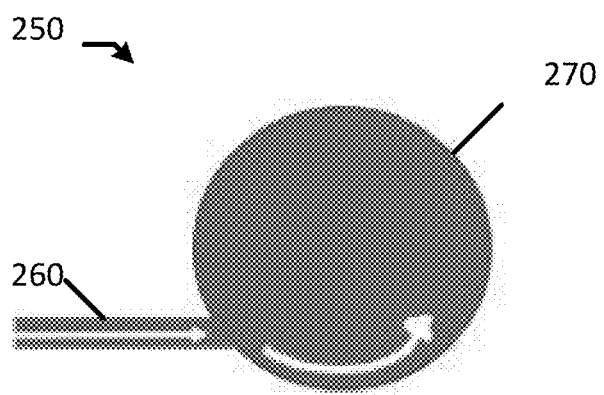
FIG. 5C illustrates an example of a junction including a cross section of an outlet manifold in the direction of flow.

FIG. 5C illustrates an example of a junction including a cross section of an outlet manifold in the direction of flow. The junction 250 as illustrated in FIG. 5B includes outlet 260 flowing into outlet manifold 270. In some embodiments, the outlet 260 and/or the outlet manifold 270 may include a corrosion resistant metal such as stainless steel. In other embodiments, the outlet 260 and/or the outlet manifold 270 may include a metal composition having titanium, gold, or the like. In other embodiments, the outlet 260 and/or the outlet manifold 270 may include a base composition (e.g., a first metal) and a coating composition (e.g., a second metal) that is configured to prevent leaching of ions from the base composition. For example, the coating composition (e.g., second metal) may prevent iron contamination of high purity electrolysis water flowing through outlet 260 and the outlet manifold 270. Examples of a second coating metal composition may include titanium, gold, and the like.

As illustrated in FIG. 5C, outlet 260 connects to outlet manifold 270 at a location other than the midpoint of outlet manifold 270. As illustrated in FIG. 5C, flow from outlet 260 travels along the x-axis as it enters the manifold outlet 270. The flow within the manifold outlet 270 subsequently travels in the z-direction. Within the example of FIG. 5C, outlet 260 is disposed near the exterior of circular manifold outlet 270. Providing outlet 260 near the exterior of outlet manifold 270 may decrease pressure in the outlet manifold 270. While providing the outlet 260 near the exterior of manifold 270 may increase swirling in the outlet manifold, doing so may also decrease pressure in the outlet manifold due to the flow entering from outlet 260 not impinging directly on a wall of outlet manifold 270, but instead swirling and following the curvature of the outlet manifold. The outlet 270 being connected to the outlet manifold 270 at a position other than the midpoint of the outlet manifold may decrease or minimize pressure in the outlet manifold, advantageously allowing an outlet manifold having a smaller diameter to be used, thus reducing material costs, and improving cell/stack efficiency.

Figure 6:
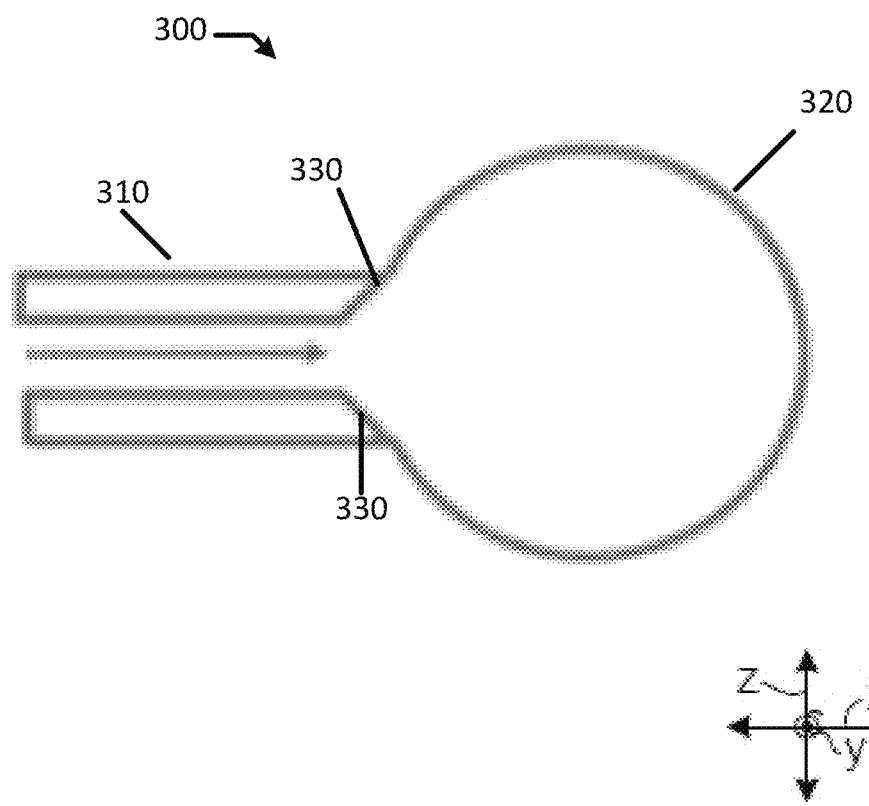
FIG. 6 illustrates a junction according to an exemplary embodiment of the present disclosure.

FIG. 6 illustrates a junction 300 according to an exemplary embodiment of the present disclosure. FIG. 6 illustrates junction 300 including outlet 310 and a cross section of outlet manifold 320. The junction 300, outlet 310, and outlet manifold 320 may all be made of corrosion resistant metal. As illustrated in FIG. 6, the outlet 310 connects to outlet manifold 320 at a center line of outlet manifold 330. However, outlet 310 does not need to connect to outlet manifold 320 at a center line. For example, outlet 310 may be connected to outlet manifold 320 near an exterior (e.g., a perimeter or circumference) of outlet manifold 320.

As illustrated in FIG. 6, the junction 300 includes mouth 330 between outlet 310 and outlet manifold 320. The mouth 330 may allow a flow leaving the outlet 310 and entering the outlet manifold 320 to expand as it enters outlet manifold 320. Allowing the flow to expand as it enters the outlet manifold 320 may advantageously reduce the pressure in outlet manifold 320 by reducing a portion of the flow from the outlet 310 that impinges on directly (e.g., perpendicularly or substantially perpendicularly [e.g., an angle within 1% or within 5% of being perpendicular]) on a wall of outlet manifold 320. Reducing the portion of a flow that impinges on a wall of outlet manifold 320 may advantageously reduce friction losses and accordingly may advantageously reduce the pressure in outlet manifold 320. Flaring out the mouth 330 may also reduce surface tension related forces, (e.g., capillary force), due to expansion of the connecting pipe diameter. Reducing capillary forces may reduce the overall manifold pressure drop in two-phase flow applications such as water electrolysis where outlet is either a mixture of oxygen gas and water or hydrogen gas and water. The mouth 330 may reduce pressure in the outlet manifold and advantageously allow an outlet manifold having a smaller diameter to be used, thus reducing material costs, and improving cell/stack efficiency.

Figure 7:
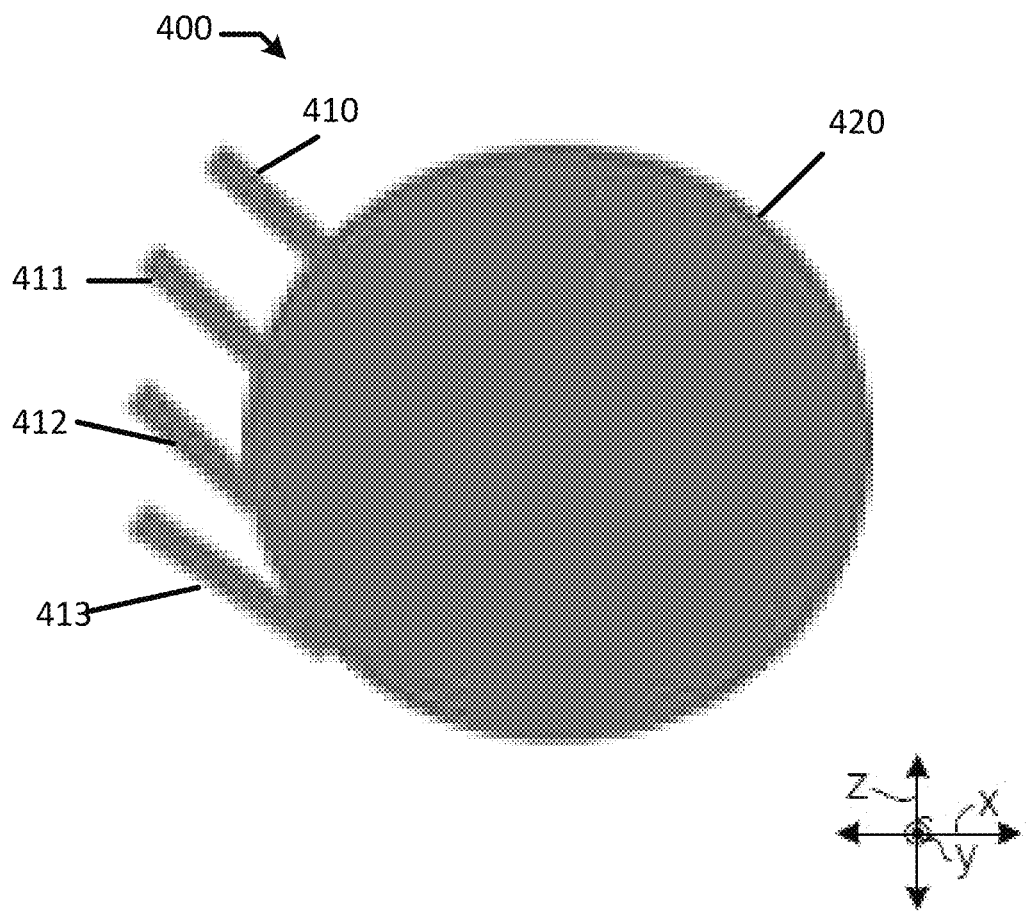
FIG. 7 illustrates a junction according to an exemplary embodiment of the present disclosure.

FIG. 7 illustrates a junction 400 according to an exemplary embodiment of the present disclosure. FIG. 7 illustrates junction 400 including outlets 410, 411, 412, and 413 and a cross section of outlet manifold 420. The junction 400, outlets 410, 411, 412, and 413 and outlet manifold 420 may all be made of corrosion resistant metal. Flow from outlets 410, 411, 412, and 413 travels within the x-y plane as it enters the manifold outlet 420. The flow within the manifold outlet 420 subsequently travels in the z-direction.

As illustrated in FIG. 7, outlets 410, 411, 412, and 413 are connected to outlet manifold 420 at various different inclination angles. The angles of outlets 410, 411, 412, and 413 may be configured to reduce the pressure drop in the outlet manifold 420. For example, outlets 410, 411, 412, and 413 may be arranged at inclination angles such that a flow from each of the outlets 410, 411, 412, and 413 contributes to a spiral flow in outlet manifold 420. For example, a uniform spiral flow may be created in the outlet manifold 420. In some examples, inlets 410, 411, 412, and 413 may all be coplanar to one another. In other embodiments, inlets 410, 411, 412, and 413 may be disposed at different locations along the length of the outlet manifold 420. In some embodiments, a difference in inclination angles between subsequent or adjacent outlets may be uniform. In other embodiments, a difference in inclination angles between subsequent or adjacent outlet may be non-uniform.

Figure 8:
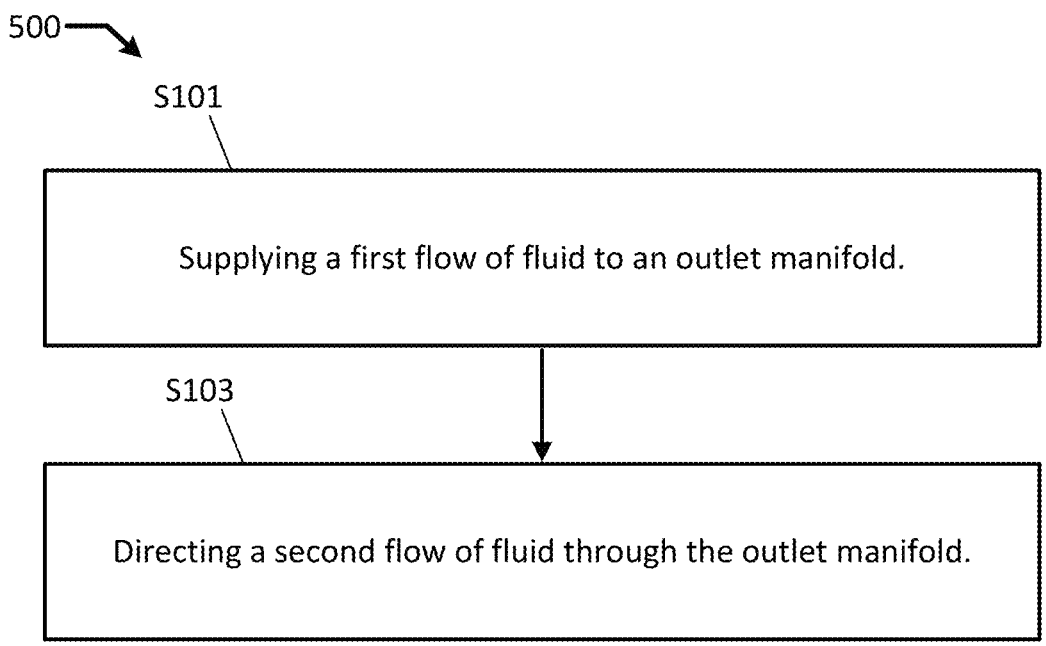
FIG. 8 illustrates a flow chart for combining flows at an outlet manifold according to an exemplary embodiment of the present disclosure.

FIG. 8 illustrates a flow chart 500 for combining flows at an outlet manifold according to an exemplary embodiment of the present disclosure. The flow chart 500 may be used in combination with one of the junctions 200, 287, and/or 297. Additional, different, or fewer acts may be provided.

At act S101, a first flow of fluid may be supplied to an outlet manifold (e.g., outlet manifold 220, 280, 290) at a junction (e.g., 200, 287, 297) between an outlet (e.g., 210, 211, 212, 213) and the outlet manifold. The first flow of fluid may be a two-phase flow of liquid and gas. The first flow of fluid may be a two-phase flow of water and gas (e.g., hydrogen, oxygen) outlet from an anode side or interface or cathode side or interface of an electrochemical or electrolytic cell or cell stack. The first flow of fluid may be supplied to the outlet manifold such that the first flow of fluid enters the outlet manifold in a first direction. In some embodiments, the junction may include an angled member (e.g., angled member 230). In other examples, the junction may include one or more elbows (e.g., elbows 286, 296).

At act S103, a second flow of fluid may be directed through the outlet manifold. The second flow of fluid may move or travel in a second direction through the outlet manifold along a longitudinal axis of the outlet manifold. The first flow of fluid supplied to the outlet manifold in a first direction may comprise a positive component velocity in the second direction along the longitudinal axis. For example, in the case of a junction 200 including an angled portion 230, an angle between the first direction of the first flow and the second direction of the second flow may be between 90° and 180°. In another example, in the case of a junction 287 or 297 the first direction of the first flow and the second direction are the same direction. Supplying the first flow to the outlet manifold in a first direction such that the first flow has a first direction having a positive component velocity in the second direction may advantageously reduce or minimize pressure in the outlet manifold allowing an outlet manifold having a smaller diameter or area to be used, thus lowering material costs, and improving efficiency of the cell or stack.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A junction apparatus comprising:
a first outlet having a first diameter configured to supply a first flow from a first plurality of electrochemical cells or a first electrochemical stack to an outlet manifold having a diameter; and
one or more secondary outlets having second diameters configured to supply one or more secondary flows from one or more second plurality of electrochemical cells or one or more second electrochemical stacks to the outlet manifold, the one or more secondary outlets having inclination angles relative to the outlet manifold configured to reduce a pressure in the outlet manifold by creating a uniform circular flow in the outlet manifold,
wherein a length of the first diameter of the first outlet and a length of the diameter of the outlet manifold are within 10% of each other, and
wherein lengths of the second diameters of the one or more secondary outlets and the length of the diameter of the outlet manifold are within 10% of each other.

2. The junction apparatus of claim 1, wherein the first outlet and the one or more secondary outlets are coplanar.

3. The junction apparatus of claim 1, wherein at least one of the first outlet, the one or more secondary outlets, or the outlet manifold comprises a corrosion resistant metal.

4. The junction apparatus of claim 1, wherein at least one of the first outlet, the one or more secondary outlets, or the outlet manifold comprises a base composition and a coating composition covering the base composition, and
wherein the coating composition is a corrosion resistant composition.

5. The junction apparatus of claim 1, wherein the first flow and the one or more secondary flows are two-phase flows comprising a liquid and a gas.

6. A junction apparatus comprising:
a first outlet configured to supply a first flow to an outlet manifold;
one or more secondary outlets configured to supply one or more secondary flows to the outlet manifold; and
the outlet manifold including a second flow,
wherein the first outlet and the one or more secondary outlets comprise elbows that extend into the outlet manifold and supply the first flow and the one or more secondary flows in a same direction as the second flow,
wherein an elbow of the first outlet extends a first distance into the outlet manifold,
wherein one or more elbows of the one or more secondary outlets extend a second distance into the outlet manifold, and
wherein the first distance is different from the second distance.

7. The junction apparatus of claim 5, wherein each secondary outlet of the one or more secondary outlets comprises a segment adjacent to the outlet manifold that is positioned at angle to the outlet manifold such that the secondary flow from the respective secondary outlet is configured to enter the outlet manifold with a component of a flow velocity from the respective secondary outlet corresponding to a direction of flow through the outlet manifold.

8. The junction apparatus of claim 7, wherein each secondary flow from the one or more secondary outlets comprises a respective first flow direction into the outlet manifold,
wherein the outlet manifold comprises an outlet flow configured to flow out of the outlet manifold in a second direction, and
wherein an angle between each respective first direction and the second direction is greater than 90° and less than 180°.

9. The junction apparatus of claim 5, wherein each secondary flow from the one or more secondary outlets comprises a respective first flow direction into the outlet manifold,
wherein the outlet manifold comprises an outlet flow configured to flow out of the outlet manifold in a second direction, and
wherein an angle between each respective first direction and the second direction is greater than 90° and less than 180°.

10. The junction apparatus of claim 9, wherein the angle is in a range of 105° and 165°.

11. The junction apparatus of claim 9, wherein the angle is in a range of 105° and 150°.

12. The junction apparatus of claim 9, wherein the angle is in a range of 105° and 135°.

13. The junction apparatus of claim 9, wherein the angle is in a range of 120° and 150°.

14. The junction apparatus of claim 1, wherein the one or more secondary outlets comprise a plurality of secondary outlets configured to supply a plurality of secondary flows to the outlet manifold.

15. The junction apparatus of claim 1, wherein the first flow and the one or more secondary flows comprise oxygen gas and water.

16. The junction apparatus of claim 1, wherein the first flow and the one or more secondary flows comprise hydrogen gas.

17. The junction apparatus of claim 6, wherein the first outlet is configured to supply the first flow from a first plurality of electrochemical cells or a first electrochemical stack to the outlet manifold, and
wherein the one or more secondary outlets are configured to supply the one or more secondary flows from one or more second plurality of electrochemical cells or one or more second electrochemical stacks to the outlet manifold.

18. The junction apparatus of claim 17, wherein the first outlet has a first diameter,
wherein the one or more secondary outlets have second diameters,
wherein a length of the first diameter of the first outlet and a length of a diameter of the outlet manifold are within 10% of each other, and wherein lengths of the second diameters of the one or more secondary outlets and the length of the diameter of the outlet manifold are within 10% of each other.

19. The junction apparatus of claim 6, wherein the first outlet has a first diameter,
wherein the one or more secondary outlets have second diameters,
wherein a length of the first diameter of the first outlet and a length of a diameter of the outlet manifold are within 10% of each other, and
wherein lengths of the second diameters of the one or more secondary outlets and the length of the diameter of the outlet manifold are within 10% of each other.

\* \* \* \* \*